United States Patent
Petersen et al.

(10) Patent No.: US 9,955,230 B2
(45) Date of Patent: Apr. 24, 2018

(54) OFDM BASED BROADCAST COMMUNICATION SYSTEM

(71) Applicant: INSTITUT FUR RUNDFUNKTECHNIK GMBH, Munich (DE)

(72) Inventors: Swen Petersen, Munich (DE); Clemens Kunert, Unterfohring (DE); Hermann Lipfert, Oberhaching (DE)

(73) Assignee: INSTITUT FUR RUNDFUNKTECHNIK GMBH, Munich (DE)

( * ) Notice: Subject to any disclaimer, the term of this patent is extended or adjusted under 35 U.S.C. 154(b) by 11 days.

(21) Appl. No.: 15/101,824

(22) PCT Filed: Nov. 27, 2014

(86) PCT No.: PCT/EP2014/075862
§ 371 (c)(1),
(2) Date: Jun. 3, 2016

(87) PCT Pub. No.: WO2015/082315
PCT Pub. Date: Jun. 11, 2015

(65) Prior Publication Data
US 2016/0309235 A1 Oct. 20, 2016

(30) Foreign Application Priority Data

Dec. 6, 2013 (IT) .............................. TO2013A1003

(51) Int. Cl.
*H04N 21/61* (2011.01)
*H04L 27/26* (2006.01)
(Continued)

(52) U.S. Cl.
CPC ........ *H04N 21/6131* (2013.01); *H04H 20/72* (2013.01); *H04H 60/07* (2013.01);
(Continued)

(58) Field of Classification Search
CPC ........ H04H 20/72; H04H 60/07; H04H 60/91; H04L 27/2602; H04N 21/2383;
(Continued)

(56) References Cited

U.S. PATENT DOCUMENTS

2008/0225778 A1* 9/2008 Vare .................. H04H 20/26
370/328
2009/0296624 A1* 12/2009 Ryu .................. H04H 20/72
370/312

(Continued)

OTHER PUBLICATIONS

Gurkan et al., On the Use of WiMAX as the Terrestrial segment for DVB-SH Networks, IWSSC 2008, Oct. 1, 2008.*
(Continued)

*Primary Examiner* — Freshteh N Aghdam
(74) *Attorney, Agent, or Firm* — Workman Nydegger

(57) ABSTRACT

FDM based broadcast transmitter arrangement for transmitting a digital audio/video information signal, wherein an encoded version of the digital audio/video information signal is encapsulated in a network layer encapsulation step in accordance with DAB, DVB-T or DVB-T2 to obtain a network layer information signal. The network layer information signal is then converted in a Data Link Layer conversion step to obtain a Data Link Layer information signal, which is subjected in a Physical Layer conversion step to obtain a broadcast information transmission signal.

23 Claims, 4 Drawing Sheets

(51) Int. Cl.
*H04N 21/438* (2011.01)
*H04H 20/72* (2008.01)
*H04H 60/07* (2008.01)
*H04H 60/91* (2008.01)
*H04N 21/2383* (2011.01)

(52) U.S. Cl.
CPC ......... *H04H 60/91* (2013.01); *H04L 27/2602* (2013.01); *H04N 21/2383* (2013.01); *H04N 21/4381* (2013.01); *H04N 21/4382* (2013.01); *H04N 21/615* (2013.01); *H04N 21/6112* (2013.01)

(58) Field of Classification Search
CPC ........... H04N 21/4381; H04N 21/4382; H04N 21/6112; H04N 21/6131; H04N 21/615
See application file for complete search history.

(56) References Cited

U.S. PATENT DOCUMENTS

| | | | | |
|---|---|---|---|---|
| 2011/0131614 A1* | 6/2011 | Sayadi | ................... | H04H 20/33 725/62 |
| 2013/0182628 A1 | 7/2013 | Gholmieh et al. | | |
| 2013/0286895 A1* | 10/2013 | Mittapalli | ............. | H04L 69/324 370/255 |
| 2014/0254609 A1* | 9/2014 | Petry | ..................... | H04L 65/601 370/466 |
| 2017/0134469 A1* | 5/2017 | Michael | ................ | H04L 65/607 |

OTHER PUBLICATIONS

Shuichi Aoki et al., *Proposed Modifications to Relevant Documents on MMT*, 93 MPEG Meeting, Jul. 22, 2010, 2 pgs.

Gurkan Gur et al., *On the Use of WiMAX as the Terrestrial Segment for DVB-SH Networks*, Satellite and Space Communications 2008, Oct. 1, 2008, 3 pgs.

David Lecompte et al., *Evolved Multimedia Broadcast/Multicast Service (eMBMS) in LTE-Advanced: Overview and Rel-11 Enhancements*, IEEE Communications Magazine, Nov. 2012, pp. 68-73.

International Search Report dated Feb. 17, 2015, issued in PCT Application No. PCT/EP2014/075862, filed Nov. 27, 2014.

* cited by examiner

OFDM BASED BROADCAST COMMUNICATION SYSTEM

FIELD OF THE INVENTION

The present invention regards an OFDM based broadcast communication system.

The invention is also related to a transmitter arrangement and a receiver arrangement operating in said communication system.

BACKGROUND ART

A massive deployment of mobile phones of the fourth generation (4G) is in progress by installing LTE architectures, substantially all over the world.

The strong tendency towards mobile internet-compatible consumer products (laptop, tablet, smartphone, MP3 players) realizing wireless audio/video broadcasts, require a non expensive, bandwidth saving solution for the distribution of Over-the-top contents (OTT) as broadcast or multicast on future LTE-smart-terminals.

Currently users are not provided with a single medium/device capable to make them enjoy both mobile radio contents and broadcast digital radio and/or TV contents.

SUMMARY OF THE INVENTION

The invention aims at improving present day transmission systems. To that purpose, the transmitter arrangement in accordance with the invention is characterized as defined in claim 1. The receiver arrangement in accordance with the invention is characterized as defined in claim 16. Preferred embodiments of the transmitter arrangement according to the invention are defined by the claims 2 to 15. Preferred embodiments of the receiver arrangement according to the invention are defined by the claims 17 to 23.

The present invention is based on the following recognition.

The Applicant has noted that, for the digital transmission of broadcast content, different broadcast standards are currently used. All these standards exhibit multi-carrier systems and rely on the OFDM principle. This allows for an efficient, robust and error tolerant transmission of contents.

The Applicant has also noted that the LTE standard also makes use of the OFDM system in its physical layer; in other terms, both the broadcast transmission systems and the LTE system rely on the same basic physical principle.

The Applicant has therefore perceived that by means of minor changes to the physical layer of the broadcast standards (Digital Terrestrial Television Broadcasting—DTTB, or Digital Terrestrial Radio Broadcasting) a signal can be generated which can be recognized by LTE terminals (e.g., smartphones). Accordingly, the LTE terminals can recognize an LTE compatible signal, although this signal actually represents a digital broadcast signal.

This has resulted in a modification to the well known broadcast transmitter arrangements, as defined in claim 1, in that, in the Physical Layer conversion step the Data Link Layer information signal is converted in accordance with a mobile radio transmission technique, so as to obtain said broadcast information transmission signal.

In this way, the invention allows for the provision of a communication technique that permits users to employ a single receiver arrangement in order to receive both mobile radio contents and broadcast digital radio and/or TV contents. This can simply be realized by loading a software application in a mobile radio receiver arrangement, which software application is able to detect from the Data Link Layer information signal whether the transmission information signal received is a broadcast information transmission signal or a mobile radio information transmission signal and, in case the information signal received is a broadcast information transmission signal, is further adapted to reconvert the Data Link Layer information signal, in accordance with a broadcast transmission technique, into a network layer information signal, decapsulate the Network Layer information signal, in accordance with said broadcast information technique, into an encoded digital audio and/or video information signal, and convert the encoded information signal into a digital audio and/or video information signal.

This would allow a present day mobile radio receiver arrangement to be upgraded such that it is also capable of receiving a broadcast information transmission signal.

It should be noted that the publication "On the use of WiMAX as the terrestrial segment for DVB-SH networks" by Gürkan Gür et al, in Satellite and Space Communications, 2008; IWSSC 2008, pp. 326-330, proposes another way of transmitting a broadcast information transmission signal via a mobile radio transmission network.

This proposal however, is different from the present invention in that the WiMAx transmission path is an additional transmission system, in parallel to the normal DVB-SH satellite transmission system, to improve the reliability of the reception of the audio/video information signal transmitted. In the WiMAX transmission system, the signal processing of the encoded audio and/or video information signal into the broadcast transmission signal, in the WiMAX protocol stack, is fully in accordance with the WiMAX transmission technique, whereas, in accordance with the present invention, the network layer encapsulation step and the Data Link layer conversion step are in accordance with the broadcast transmission technique.

Further, the publication "Evolved multimedia broadcast/multicast service (eMBMS) in LTE-advanced: overview and Rel-11 enhancements" by Lecompte et al, in IEEE Communications magazine, vol. 50, no. 11, pp. 68-74, gives an overview of other ways of how a broadcast information transmission signal can be transmitted via LTE. This is, again, different from the present invention in that, again, as in the previously mentioned publication, the signal processing in the LTE protocol stack is fully in accordance with the LTE transmission technique.

BRIEF DESCRIPTION OF THE DRAWINGS

Further features and advantages will become more apparent from the detailed description of preferred but not exclusive embodiments of the present invention. This description will be set out hereinafter with reference to the accompanying drawings, given by way of non-limiting example, in which.

DETAILED DESCRIPTION OF THE PREFERRED EMBODIMENTS

It is to be expected that the teachings of the present invention will result in an improved insight by standardization bodies, which could lead to a future modification of either the present day standard specifications covering a broadcast transmission technique or the present day standard specifications covering a mobile radio transmission technique, so as to bring all transmission parameters in common for both the broadcast transmission technique and the mobile radio transmission technique. In such situation, an OFDM transmitter in accordance with the present invention would have all transmission parameters in common with both the present day broadcast transmission standard specification and a newly adopted mobile radio transmission standard specification, or would have all transmission parameters in common with a present day mobile radio standard specification and a newly adopted broadcast transmission standard specification.

Figure 1:
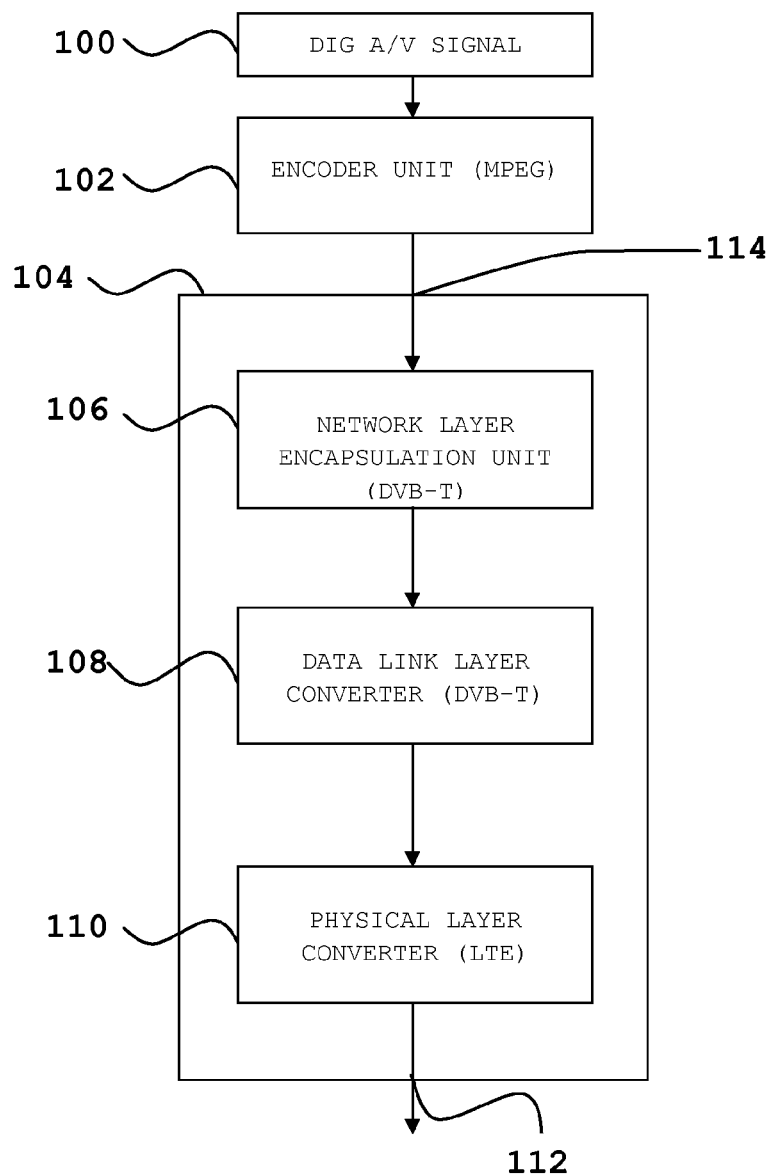
FIG. 1 shows a block diagram of a transmitter arrangement according to the present invention.

FIG. 1 shows an embodiment of an OFDM based broadcast transmitter arrangement in accordance with the invention.

The broadcast transmitter arrangement is configured for transmitting broadcast information transmission signals in the form of a digital audio and/or video information signal.

The transmitter arrangement comprises an input 114 for receiving the digital audio and/or video information signal in encoded form. Encoders for encoding the digital audio and/or video information signal are well known in the art, such as in the form of MPEG audio and/or video encoders, such as in accordance with ISO/IEC 11172 (MPEG-1), ISO/IEC 13818 (MPEG-2) or ISO/IEC 14496 (MPEG-4) for encoding moving pictures and associated audio, or for encoding digital audio information signals.

FIG. 1 shows an encoder unit 102 for encoding the digital audio and/or video information signal generated by a source 100. The encoded audio and/or video information signal is subsequently supplied to the input 114 of the broadcast information transmission arrangement. It should thus be stressed here that, in sofar the invention is concerned, this invention does not reside in the blocks 100 and 102. Those blocks thus do not form part of the protection aimed at in the claims.

The transmitter arrangement comprises a modulation unit 104 for generating the broadcast information transmission signal 112 from the encoded audio and/or video information signal supplied to the input 114, for transmission via a mobile radio transmission medium. The modulation unit 104 comprises a Network Layer encapsulation unit 106, which is adapted to encapsulate the modulated audio and/or video information signal into a network layer information signal in accordance with a broadcast transmission technique, and to supply the network layer information signal to its output. In case, the digital information signal to be transmitted is an audio information signal (broadcast radio), such broadcast transmission technique could be in accordance with the DAB broadcast transmission standard as standardized in ETSI EN300401. In case, the digital information signal to be transmitted is a digital A/V information signal (broadcast TV), such broadcast transmission technique could be in accordance with the DVB-T or DVB-T2 broadcast transmission standard as standardized in ETSI EN302755.

The modulation unit 104 also comprises a Data Link Layer converter unit 108, which is adapted to convert the Network layer information signal from the Network Layer encapsulation unit 106 in a Data Link Layer conversion step so as to obtain a Data Link Layer information signal. This conversion is again in accordance with the broadcast transmission technique described above, and results in the Data Link Layer information signal at the output of the unit 108.

The modulation unit 104 further comprises a Physical Layer converter unit 110. The Physical Layer converter unit 110 is adapted to convert the Data Link Layer information signal from the Data Link Layer converter unit 108 in a Physical Layer conversion step into a broadcast information transmission signal, which is supplied to the output 112 of the modulator unit 104. The broadcast transmission information signal at the output 112 can be supplied to e.g., an antenna, for terrestrial broadcast.

In accordance with the invention, the conversion in the Physical Layer converter unit 110 is in accordance with a mobile radio transmission technique. Such mobile radio transmission technique could be in accordance with the LTE (Long Term Evolution) or LTE-A(dvanced) mobile radio transmissions standard, as standardized in 3GPP TS36.211 and 3GPP TR36.819. This results in the broadcast information transmission signal having:

- an FFT size in accordance with said mobile radio transmission technique,
- a bandwidth in accordance with said mobile radio transmission technique,
- a guard interval in accordance with said mobile radio transmission technique; and
- an active OFDM symbol duration in accordance with said mobile radio transmission technique.

The table hereunder discloses the most relevant parameters given above for the various transmission techniques: DVB-T, DVB-T2, LTE and LTE-A:

|  | DVB-T | DVB-T2 | LTE | LTE-A |
| --- | --- | --- | --- | --- |
| FFT Size (×1024) | 2, 8 | 1, 2, 4, 8, 16, 32 | 1, 2, 4 | 1, 2, 4 |
| Bandwidth (MHz) | 6, 7, 8 | 1.7, 5, 6, 7, 8, 10 | 1.4, 3, 5, 10, 15, 20 | 1.4, 3, 5, 10, 15, 20, and any combination of them, up to a total bandwidth of 100 MHz |
| Guard Interval (Extended Cyclic | 7, 14, 28, 56, 112, 224 | 7, 14, 28, 56, 112, 224 | 16.7 (33.3 and, 66.7 are expected to be included in the future) | 16.7, 33.3, 66.7, . . . |

-continued

|  | DVB-T | DVB-T2 | LTE | LTE-A |
|---|---|---|---|---|
| Prefix ECP) in µs |  |  |  |  |
| Modulation-Modes | QPSK, 16QAM, 64QAM | QPSK, 16QAM, 64QAM, 256QAM | QPSK, 16QAM, 64QAM | QPSK, 16QAM, 64QAM, 256QAM |
| Active symbol duration in µs | = guard interval × n, where n = 4, 8, 16, 32 | = guard interval × n, where n = 4, 8, 16, 32, 128/19, 256/19, 128 | = guard interval × 4 | = guard interval × 4 |

It should be noted here that this table is not complete, in that other broadcast information techniques, such as ATSC and DMB also are OFDM based transmission systems, for which the invention would equally be applicable.

From the above table, it becomes clear that, in case the mobile radio transmission technique is LTE, the various parameters should be as follows:

In case of DVB-T, the FFT size is preferably 2048, as this is the only FFT size that is available for both the DVB-T and LTE transmission technique. Or, the 1024 or 4096 option of LTE could be chosen, which options are not present in DVB-T.

In case of DVB-T2, the FFT size is one of 1024, 2048 and 4096, as all of them are available in both the DVB-T2 and LTE transmission technique.

In case of DVB-T, the bandwidth should be newly defined. One could adopt 5 MHz or 10 MHz, or any of the other bandwidths defined in LTE.

In case of DVB-T2, the 5 MHz mode or the 10 MHz mode of LTE, also present in the DVB-T2 transmission technique, could be chosen.

As regards the guard interval, for both DVB-T and DVB-T2, the values from the LTE standard specification should be chosen, that is: 16.7 µs, 33.3 µs or higher multiples of 33.3 µs, such as 66.7 µs.

As regards the active symbol duration, this parameter should also be chosen in accordance with the LTE transmission technique. Its value actually follows the value for the guard interval chosen, in that it should be equal to 4 times the guard interval chosen, see the table.

From the above table, it becomes further clear that, in case the mobile radio transmission technique is LTE-A, the various parameters should be as follows:

In case of DVB-T, the FFT size is preferably 2048, as this is the only FFT size that is available for both the DVB-T and LTE-A transmission technique. Or, the 1024 or 4096 option of LTE-A could be chosen, which options are not present in DVB-T.

In case of DVB-T2, the FFT size is one of 1024, 2048 and 4096, as all of them are available in both the DVB-T2 and LTE-A transmission technique.

In case of DVB-T, the bandwidth should be newly defined. One could adopt 5 MHz or 10 MHz, or any of the other bandwidths defined in LTE-A.

In case of DVB-T2, the 5 MHz mode or the 10 MHz mode of the LTE-A transmission technique, which are also present in the DVB-T2 transmission technique, could be chosen.

As regards the guard interval, for both DVB-T and DVB-T2, the values from the LTE-A standard specification should be chosen, that is: 16.7 µs, 33.3 µs or higher multiples of 33.3 µs, such as 66.7 µs.

As regards the active symbol duration, this parameter should also be chosen in accordance with the LTE-A transmission technique. Its value actually follows the value for the guard interval chosen, in that it should be equal to 4 times the guard interval chosen.

As regards the modulation modes, it can be stated that the following three modulation modes, QPSK, 16QAM and 64QAM, can all be chosen, as they are common for both the LTE and the LTE-A transmission techniques. The 256QAM modulation mode could also be adopted in case of LTE-A.

The Applicant believes that this is an optimal adaptation to performance and stability of the transmission. This would also allow to create the reception of a cross-regional program in urban areas.

As present, DVB-T is already widely used in urban areas. With an guard interval of, for example, 33.3 µs, cell sizes are realizable (e.g., with diameter of 10 km) which are in dimension just between the typical High-Power-High-Tower (HPHT) broadcast cell-sizes (diameter up to 100 km) and the typical cell-sizes of mobile phone communication (diameter up to 2 km).

Further, country wide single frequency networks (SFN) can be realized, with moreover a substantially lower transmission power than with known HPHT networks.

It has to be understood that also different digital TV standards can be used, suitably modifying the same in order to allow transmission by means of LTE or LTE-A techniques.

As mentioned above, the OFDM based broadcast communication system according to the invention further comprises one or more receiver arrangements.

The structure and functionalities of one receiver arrangement is disclosed and described hereinafter with reference to FIG. 2. Each receiver arrangement belonging to the communication system can have the same structure and functionalities.

Figure 2:
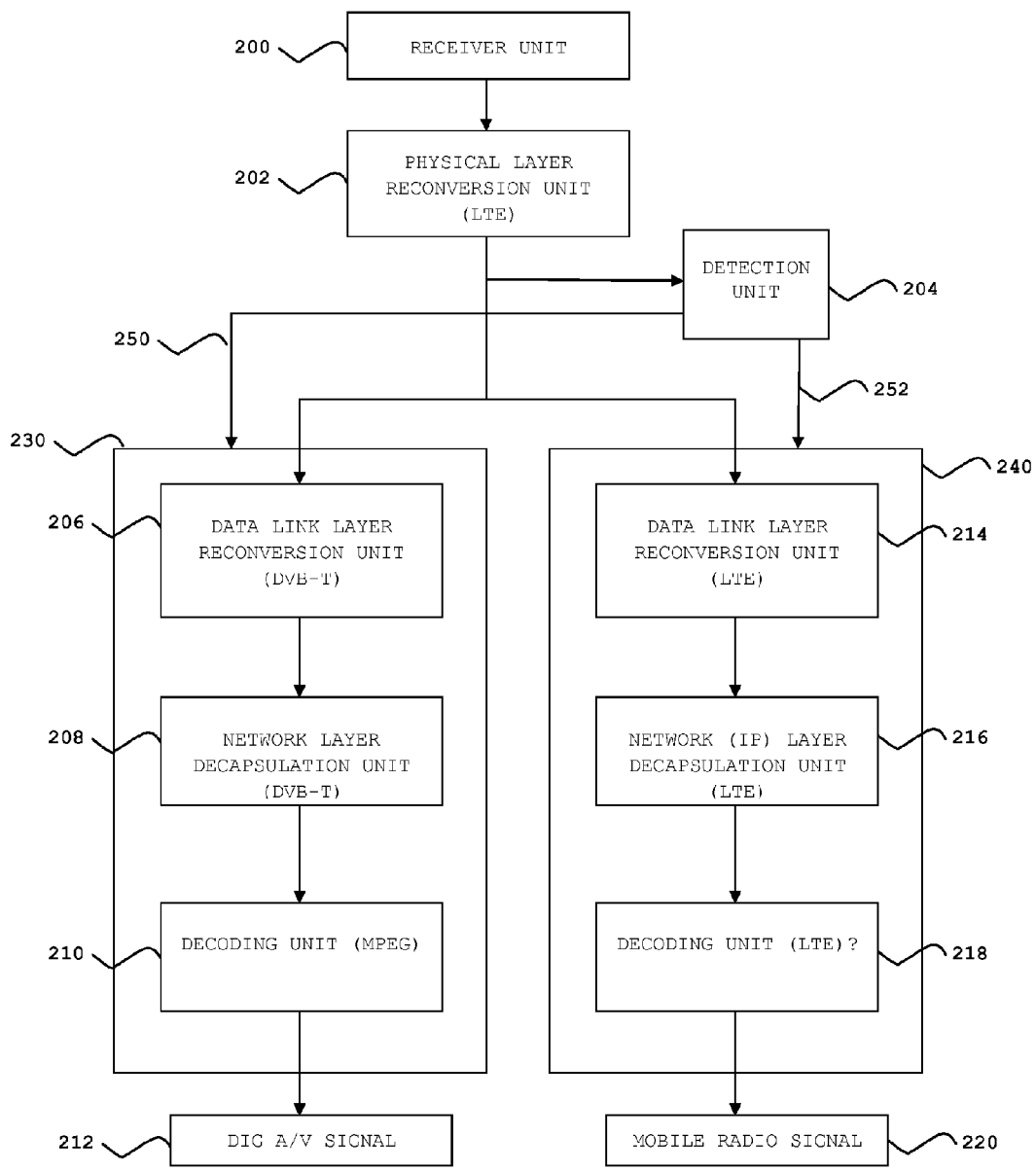
FIG. 2 shows a block diagram of a receiver arrangement in accordance with the invention.

Preferably the OFDM based receiver arrangement of FIG. 2 is a mobile device, or is included in a mobile device, the mobile device being for example a tablet or a smartphone.

The receiver arrangement comprises a receiver unit 200 for receiving the broadcast information transmission signal. The receiver arrangement is configured to obtain, from said broadcast information transmission signal, a corresponding digital audio and/or video information signal 212. Such corresponding digital audio and/or video information signal 212 is a replica of the digital audio and/or video information signal 100 from which the broadcast information transmission signal 112 is generated by the transmitter of FIG. 1. Preferably the receiver unit 200 can also receive other types of signals, as will be disclosed in more detail in the following.

The receiver arrangement of FIG. 2 comprises a Physical Layer Reconversion unit 202 configured to reconvert, in accordance with a mobile radio transmission technique (such as LTE or LTE-A), the transmission information signal received into a Data Link Layer information signal. The receiver arrangement also comprises a detection unit 204 for detecting from the Data Link Layer information signal whether the transmission information signal received is a broadcast information signal or a mobile radio information transmission signal.

The receiver arrangement is further provided with a demodulation unit 230 for demodulating the Data Link Layer information signal in case the information signal received is a broadcast information transmission signal. The demodulation unit 230 comprises a Data Link Layer reconversion unit 206 for reconverting the Data Link Layer information signal, in accordance with a broadcast transmission technique (such as DAB, DVB-T or DVB-T2), into a Network Layer information signal, an Network Layer decapsulation unit 208 for decapsulating the Network Layer information signal, in accordance with said broadcast information technique (such as DAB, DVB-T or DVB-T2), into an encoded information signal, and a decoding unit 210 for converting the encoded information signal into the digital audio and/or video information signal 212.

The detection unit 204 is adapted to generate a first control signal 250 in response to a detection from the Data Link Layer information signal that the transmission information signal received is a broadcast transmission information signal. If so, the first mentioned demodulation unit 230 is enabled, under the influence of this first control signal 250, to demodulate the Data Link Layer information signal.

In a preferred embodiment, the receiver arrangement further comprises a second demodulation unit 240 configured to decode a mobile radio information transmission signal transmitted according to said mobile radio transmission technique. To that purpose, the detection unit 204 is adapted to generate a second control signal 252 in response to a detection from the Data Link Layer information signal that the transmission information signal received is a mobile radio information transmission signal, and the demodulation unit 240 is enabled, under the influence of this second control signal 252, to demodulate the Data Link Layer information signal.

The demodulation unit 240 comprises a Data Link Layer reconversion unit 214 for reconverting the Data Link Layer information signal, in accordance with a mobile radio transmission technique (such as LTE or LTE-A), into a Network Layer information signal, a Network Layer decapsulation unit 216 for decapsulating the Network Layer information signal, in accordance with said mobile radio transmission technique, into an encoded information signal, and a decoding unit 218 for converting the encoded information signal into a mobile radio information signal 220.

The detection of the type of signal received, whether it is a broadcast information transmission signal or a mobile radio information transmission signal, is realized by detecting a signal indicator (not shown) present in the Data Link Layer information signal, indicating said type of signal. In an embodiment, this signal type indicator is included in the MAC header of the Data Link Layer information signal, to be described later.

Figure 3:
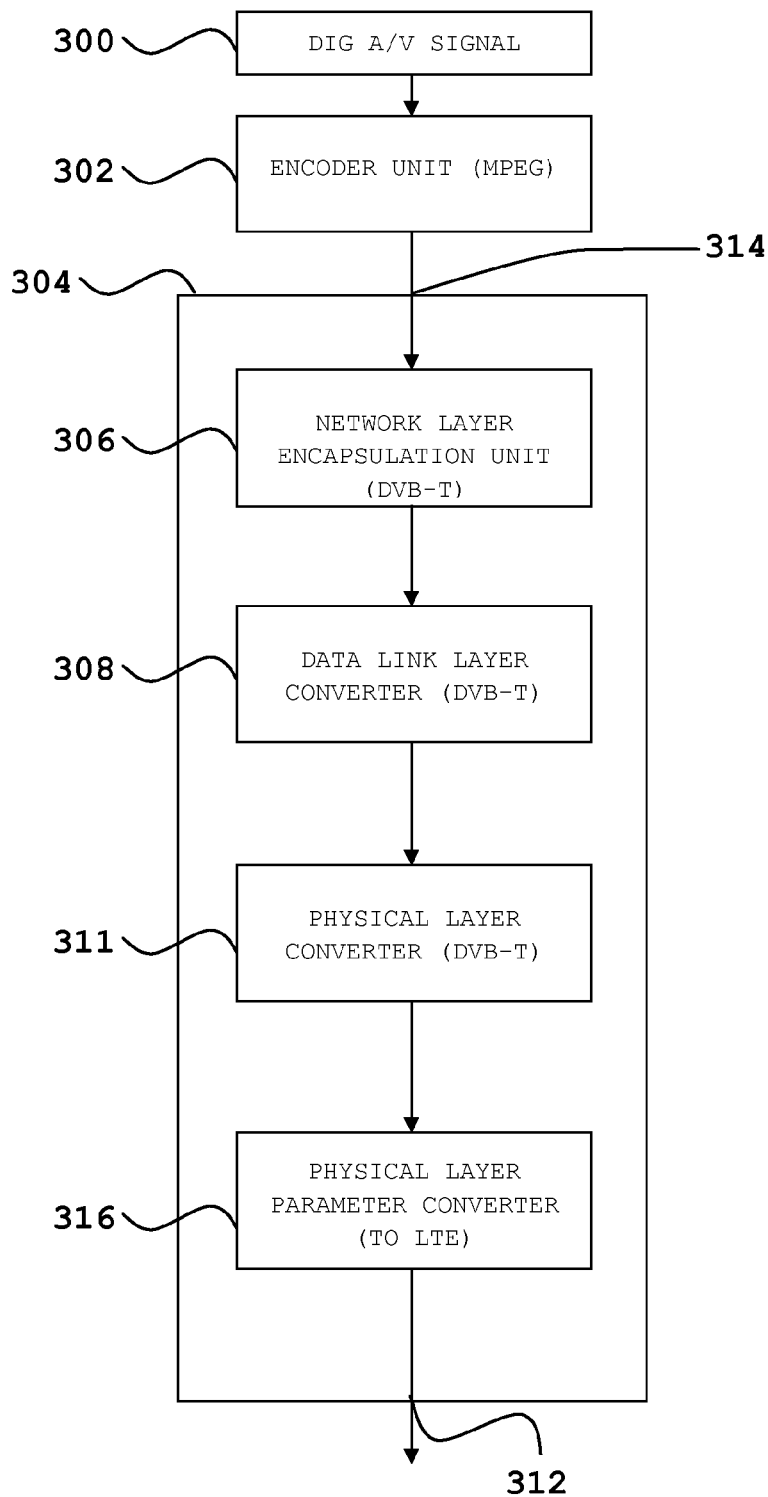
FIG. 3 shows another embodiment of the transmitter arrangement in accordance with the invention.

FIG. 3 shows another embodiment of the transmitter arrangement according to the invention. The embodiment of FIG. 3 shows a large resemblance with the embodiment of FIG. 1. Elements in the transmitter arrangement of FIG. 1 bearing the reference numeral 1xy and elements in the transmitter arrangement of FIG. 3 bearing the reference numeral 3xy perform the same functioning. The only difference between the two embodiments lie in the replacement of the element 110 in FIG. 1 by the series connection of the elements 311 and 316 in FIG. 3. Element 311 is, as element 110 in FIG. 1, a Physical Layer Converter unit, which is however adapted to convert the Data Link Layer information signal into a broadcast information transmission signal with physical parameters in accordance with the broadcast transmission technique. The broadcast information transmission signal thus obtained is subsequently modified in the Physical Layer Parameter Convert unit 316 into a broadcast information signal with physical parameters in accordance with the mobile radio transmission technique. This can, as an example be realized in that first, in the converter 316, a reconversion is taken place to reconvert the broadcast transmission information signal into the previously mentioned Data Link Layer information signal, in accordance with the broadcast transmission technique. Thereafter, the Data Link Layer information signal so obtained is again converted in a Physical Layer converter unit, alike the converter unit 110 in FIG. 1, into a broadcast information transmission signal with Physical parameters in accordance with the mobile radio transmission technique. In this way, a present day available DVB transmitter could be employed to generate a standard conform DBV-T (or T2) transmission signal, which is subsequently converted into the signal 312, with physical parameters in accordance with the mobile radio transmission technique, using the converter unit 316.

Figure 4:
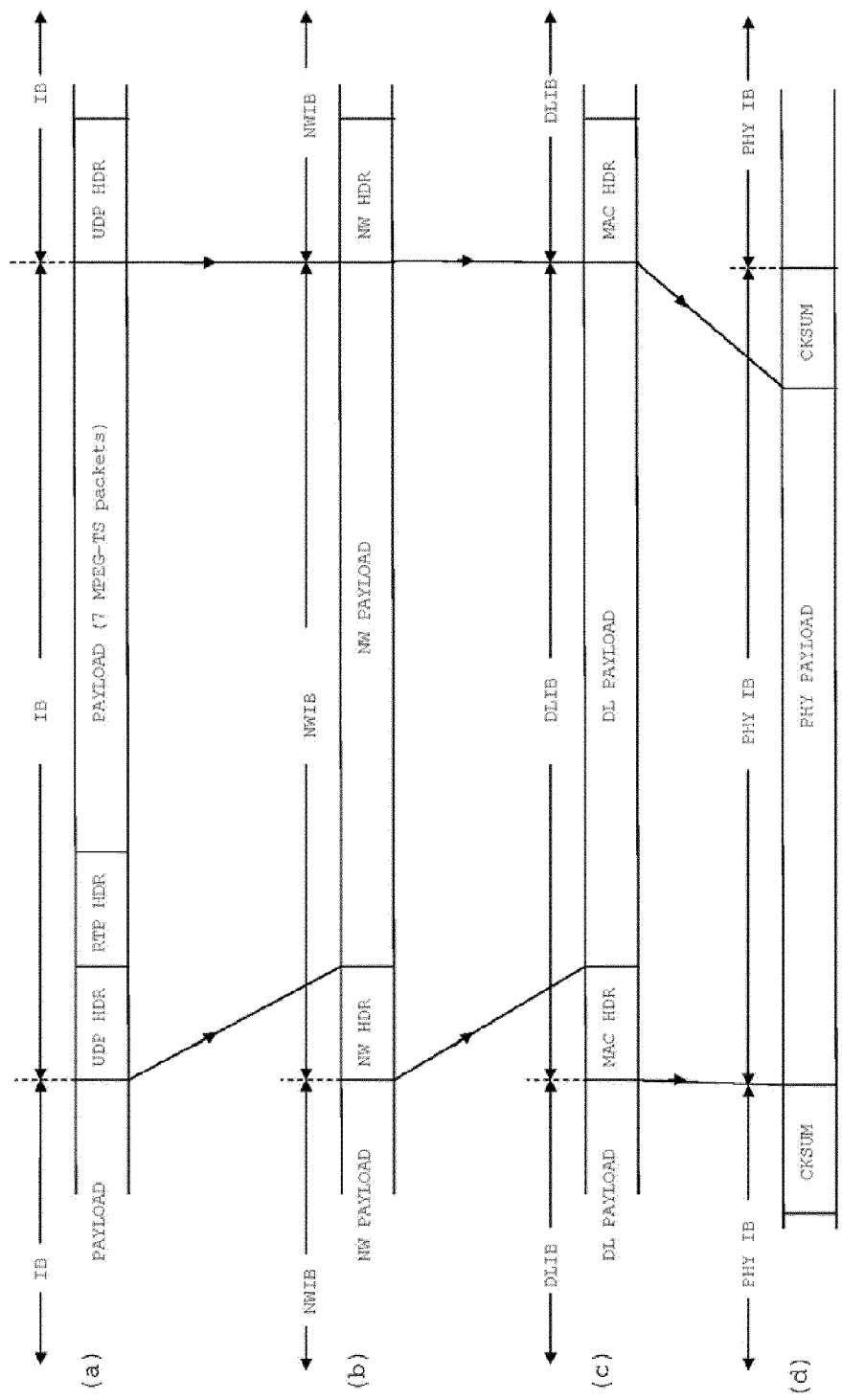
FIG. 4 shows various data information streams occurring in the transmitter arrangement of FIG. 1.

The signal processing as carried out by the transmitter arrangement in accordance with the invention will now be further explained with reference to FIG. 4, which shows various data streams as they occur in the transmitter arrangement of FIG. 1.

FIG. 4a shows the serial data stream that is supplied to the input 114. The serial data stream is e.g an MPEG-2 compatible transport stream comprising MPEG TS (transport stream) packets. In this example, each time 7 MPEG transport packets are included in an information block IB. More precisely, the 7 MPEG packets are included in a PAYLOAD portion of the information block IB. The PAYLOAD portion is preceded by an RTP header and a UDP header. The adding of the RTP and UDP headers to the MPEG TS packets could have been realized in the encoder unit 102 or in the Network Encapsulation unit 106. At this moment, it is assumed that this adding has taken place in the encoder unit 102, so that the signal stream of information blocks IB as shown in FIG. 4a is supplied as the input signal to the input 114 of the modulator unit 104.

The data stream of FIG. 4a is supplied to the Network Layer encapsulation unit 106, in which the data stream of FIG. 4a is encapsulated into a Network Layer information signal that is shown in FIG. 4b. This encapsulation results in encapsulating the information blocks IB of FIG. 4a, shown in FIG. 4b as NW (Network Layer) PAYLOAD, into Network Layer information blocks NWIB of the Network Layer information signal. In the Network Layer encapsulation step, an NW HDR (Network header) is added to the NW PAYLOAD. As an example, the NW HDR could include an IP (Internet Protocol) header. A more detailed description of the encapsulation step in the Network Layer encapsulation unit can be found in the DVB specification, ETSI TR 102469 V1.1.1 (2006-05), chapter 6: Protocol stack, the pages 31 and further.

The data stream of FIG. 4b is subsequently supplied to the Data Link Layer converter unit 108, in which the data stream of FIG. 4b is converted into the serial data stream of FIG. 4c. This conversion results in encapsulating the Network Layer information blocks NWIB of FIG. 4b, shown in FIG. 4c as DL (Data Link Layer) PAYLOAD, into Data Link Layer information blocks DLIB of the Data Link Layer information signal. In the Data Link Layer converter unit 108, amongst others, a MAC (Medium Access Control) header (MAC HDR) is added. Potentially, also a tail block, like a checksum, could be added at the end of the PAYLOAD portion of the DLIB block. A more detailed description of the Data Link Layer conversion step in the Data Link Layer conversion unit 108 can again be found in the DVB specification, ETSI TR 102469 V1.1.1 (2006-05), chapter 6: Protocol stack, the pages 31 and further.

The data stream of FIG. 4c is subsequently supplied to the Physical Layer converter unit 110, in which the data stream of FIG. 4c is converted into the serial data stream of FIG. 4d. This conversion results in encapsulating the Data Link Layer information blocks DLIB of FIG. 4c, shown in FIG. 4d as PHY (Physical Layer) PAYLOAD, into Physical Layer information blocks PHYIB of the Physical Layer information signal. In the Physical Layer converter unit 110, amongst others, a CRC checksum (CKSUM) is added. A more detailed description of the Physical Layer conversion step in the Physical Layer conversion unit 110 can be found in e.g the LTE specifications ETSI 3GPP TS36.211 and 3GPP TR36.819.

The conversion step in the unit 110 results in a broadcast transmission signal with values for the physical parameters FFT size, bandwidth, guard interval and active symbol duration which satisfy a mobile radio transmission technique, such as LTE or LTE-A.

Subsequently, in accordance with one of the modulation modes of the mobile radio transmission technique, such as QPSK, 16QAM or 64QAM for LTE, and QPSK, 16QAM, 64QAM or 256QAM for LTE-A, the broadcast information signal can be transmitted.

The invention claimed is:

1. A broadcast transmitter arrangement for transmitting a digital audio and/or video information signal, the broadcast transmitter arrangement comprising an input for receiving an encoded version of the digital audio and/or video information signal, and a modulation unit for generating a broadcast information transmission signal from the encoded audio and/or video information signal for transmission via a mobile radio transmission medium,
the modulation unit being adapted to
encapsulate the encoded audio and/or video information signal in a network layer encapsulation step in accordance with a broadcast transmission technique, so as to obtain an network layer information signal,
convert the network layer information signal in a Data Link Layer conversion step in accordance with the broadcast transmission technique, so as to obtain a Data Link Layer information signal,
subject the Data Link Layer information signal to a Physical Layer conversion step in accordance with a mobile radio transmission technique, so as to obtain said broadcast information transmission signal.

2. The broadcast transmitter arrangement as claimed in claim 1, wherein the broadcast information transmission signal has at least one transmission parameter which has a value in accordance with said mobile radio transmission technique only, the values of the other one or more transmission parameters being in common for both the mobile transmission technique and the broadcast transmission technique.

3. The broadcast transmitter arrangement as claimed in claim 1, wherein the broadcast information transmission signal has a guard interval in accordance with said mobile radio transmission technique.

4. The broadcast transmission arrangement as claimed in claim 3, wherein the broadcast information transmission signal has an active symbol duration in accordance with said mobile radio transmission technique.

5. The broadcast transmitter arrangement as claimed in claim 3, wherein the broadcast information transmission signal has a Fast Fourier Transform (FFT) size in accordance with said mobile radio transmission technique.

6. The broadcast transmitter arrangement as claimed in claim 3, wherein the broadcast information transmission signal has a bandwidth in accordance with said mobile radio transmission technique.

7. The broadcast transmitter arrangement according to claim 1, wherein said broadcast transmission technique is a Digital Terrestrial Broadcast technique.

8. The broadcast transmitter arrangement according to claim 1, wherein said mobile radio transmission technique is a Long Term Evolution (LTE) or Long Term Evolution—Advanced (LTE-A) technique.

9. The broadcast transmitter arrangement according to claim 1, wherein said broadcast information transmission signal has a guard interval substantially equal to 100/6 (~16,6667) µs, or substantially equal to a multiple thereof.

10. The broadcast transmitter arrangement according to claim 1, wherein said broadcast information transmission signal has an active symbol duration substantially equal to 400/6 (~66.6667 µs) or substantially equal to a multiple thereof.

11. The broadcast transmitter arrangement according to claim 1, wherein said broadcast information transmission signal has a Fast Fourier Transform (FFT) size of 2 kHz when the broadcast transmission technique is Digital Video Broadcast—Terrestrial (DVB-T).

12. The broadcast transmitter arrangement according to claim 1, wherein said broadcast information transmission signal has a Fast Fourier Transform (FFT) size of 1 kHz, 2 kHz or 4 kHz when the broadcast transmission technique is Digital Video Broadcast—Terrestrial Version 2 (DVB-T2).

13. The broadcast transmitter arrangement according to claim 1, wherein said broadcast information transmission signal has a bandwidth of 5 MHz or 10 MHz when the broadcast transmission technique is Digital Video Broadcast—Terrestrial (DVB-T).

14. The broadcast transmitter arrangement according to claim 1, wherein said broadcast information transmission signal has a bandwidth of 5 MHz or 10 MHz when the broadcast transmission technique is Digital Video Broadcast—Terrestrial Version 2 (DVB-T2).

15. The broadcast transmitter arrangement as claimed in claim 1, wherein said Data Link Layer information signal has been modulated in the Physical Layer conversion step with a modulation mode in accordance with said mobile radio transmission technique so as to obtain said broadcast information transmission signal.

16. A broadcast based mobile radio receiver arrangement comprising a receiver unit for receiving an information transmission signal in the form of a broadcast information transmission signal as generated by the broadcast transmitter arrangement as claimed in claim 1, or for receiving a mobile radio information transmission signal, said broadcast information transmission signal having a guard interval in accordance with a mobile radio transmission technique, said receiver arrangement comprising a Physical Layer reconversion unit for reconverting the transmission information signal received into a Data Link Layer information signal, a detection unit for detecting from the Data Link Layer information signal whether the transmission information signal received is a broadcast information signal or a mobile radio information transmission signal, that the receiver arrangement is further provided with a demodulation unit for demodulating the Data Link Layer information signal in case the information signal received is a broadcast information transmission signal, the demodulation unit comprising:

a Data Link Layer reconversion unit for reconverting the Data Link Layer information signal, in accordance with a broadcast transmission technique, into a network layer information signal, a network layer decapsulation unit for decapsulating the network Layer information signal, in accordance with said broadcast transmission technique, into an encoded information signal, and a decoding unit for converting the encoded information signal into a digital audio and/or video information signal.

17. The broadcast based mobile radio receiver arrangement as claimed in claim 16, wherein said broadcast information transmission signal has an active symbol duration in accordance with said mobile radio transmission technique.

18. The broadcast based mobile radio receiver arrangement as claimed in claim 16, wherein said broadcast information transmission signal has a Fast Fourier Transform (FFT) size and in accordance with said mobile radio transmission technique.

19. The broadcast based mobile radio receiver arrangement as claimed in claim 16, wherein said broadcast information transmission signal has a bandwidth in accordance with said mobile radio transmission technique.

20. The broadcast based mobile radio receiver arrangement as claimed in claim 16, further comprising a second demodulation unit configured to decode a mobile radio information transmission signal transmitted according to said mobile radio transmission technique.

21. The broadcast based mobile radio receiver arrangement as claimed in claim 16, wherein said demodulation unit is in the form of a software application stored in said receiver arrangement.

22. The broadcast based mobile radio receiver arrangement as claimed in claim 16, wherein the detection unit is adapted to generate a first control signal in response to a detection from the Data Link Layer information signal that the information transmission signal received is a broadcast information transmission signal, and that the demodulation unit is adapted to demodulate the Data Link Layer information signal in response to said first control signal.

23. The broadcast based mobile radio receiver arrangement as claimed in claim 20, wherein the detection unit is adapted to generate a second control signal in response to a detection from the Data Link Layer information signal that the information transmission signal received is a mobile radio information transmission signal, and that the second demodulation unit is adapted to demodulate the Data Link Layer information signal in response to said second control signal.

* * * * *